April 14, 1931.   R. W. FISHBACK   1,800,380
BRAKE TAKE-UP
Filed March 6, 1929
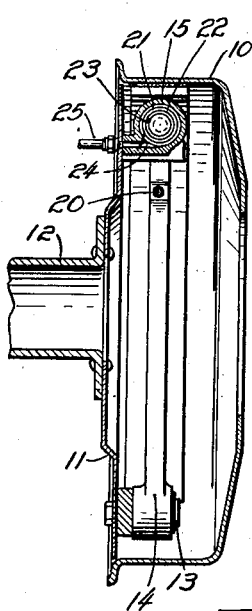
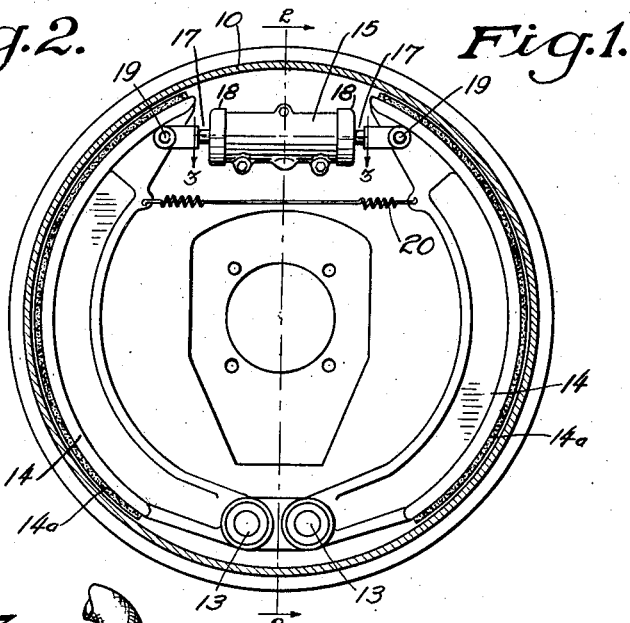
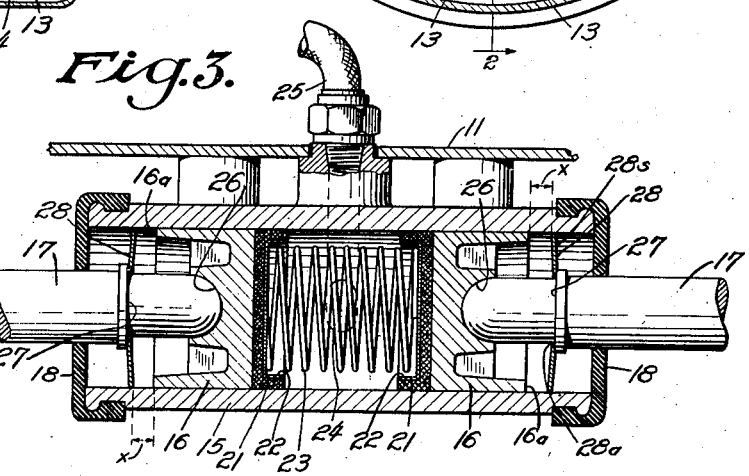
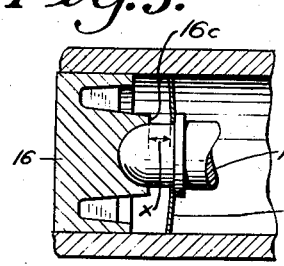
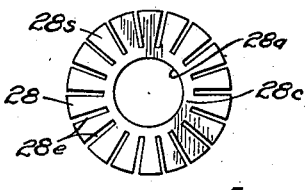
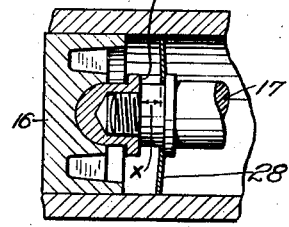
INVENTOR
ROBERT W. FISHBACK.
ATTORNEY Patented Apr. 14, 1931

1,800,380

UNITED STATES PATENT OFFICE

ROBERT W. FISHBACK, OF LOS ANGELES, CALIFORNIA, ASSIGNOR TO HUGHES TOOL COMPANY, OF HOUSTON, TEXAS, A CORPORATION OF TEXAS

BRAKE TAKE-UP

Application filed March 6, 1929. Serial No. 344,853.

This invention relates to braking apparatus and is more particularly directed to improved wear compensating means associated with a brake of the general type usually employed on motor vehicles.

It is an object of the invention to provide an improved take-up means for automatically compensating for wear of the braking surfaces so as to maintain the same braking efficiency when said surfaces become worn as when they are new.

A further object is to provide such a device associated with the operating means of a hydraulic brake, to insure a uniform stroke of said operating means while producing a change of location of the zone of said stroke coincident to wear of the braking surfaces.

It is another object to provide a take-up device which consists of a single one-piece element capable of being cheaply made by stamping from sheet metal.

Various other objects and advantages will be more fully apparent from the following description of the accompanying drawings which form a part of this disclosure and which illustrate a preferred form of embodiment of the invention.

In the drawings,

Fig. 1 is a side elevation of a brake mechanism of the hydraulic type containing the improvements of the present invention, the brake drum being shown in section.

Fig. 2 is a vertical section taken on the line 2—2 of Fig. 1.

Fig. 3 is an enlarged plan section taken on the line 3—3 of Fig. 1.

Fig. 4 is a detail plan view of the take-up element employed.

Fig. 5 is a detail section showing the take-up device associated with a modified form of brake operating means.

Fig. 6 is a similar detail section showing the device associated with still another modified form of brake operating means.

In brake mechanism of the general character herein disclosed, the braking effect is produced by movement of the brake shoes a distance sufficient to move them from a position of spaced relation with respect to the brake drum, to tight frictional engagement therewith. This movement is effected by introduction of fluid under pressure into a cylinder having a brake operating piston associated with the brake shoe. The source of pressure may be of any desired character capable of supplying fluid to the brake cylinder under sufficient pressure to produce the desired braking effect and in the usual practice such pressure is supplied by a master piston having a limited operating stroke producing, under normal conditions, a maximum pressure sufficient for producing a maximum braking effect. However, brake linings are subjected to relatively rapid wear and may soon become so worn as to require an appreciable increase of the stroke of the brake piston in relation to the limited stroke of the master piston, to bring the brake shoe into contact with the brake drum, thus rendering it impossible to obtain a maximum braking effect without readjusting the brake, unless some means is provided for effecting an automatic adjustment as the wear takes place.

In accordance with the present invention, wear compensating means is provided to at all times insure a uniform brake movement from disengaged to maximum braking positions but which will shift the zone of such uniform movement coincident with wear of the braking surfaces.

Referring to the drawings, Figs. 1 and 2 illustrate a general brake assembly including a brake drum 10 which may be secured in any desired manner to a vehicle wheel (not shown) to rotate therewith. A brake supporting plate 11 is preferably secured to an axle housing 12, and pivotally supported upon studs 13 fixed to said plate are opposed brake shoes 14 disposed within the brake drum and each having a brake lining 14a secured to its outer surface and adapted, when said shoes are expanded, to engage the inner brake surface of the drum.

Mounted upon the upper portion of the plate 11 between the free ends of the opposed brake shoes 14 is a brake cylinder 15, said cylinder, as shown in Fig. 3, containing opposed pistons 16, each engaging a companion piston rod 17 which extends outwardly through a bore in an adjacent end wall 18 of the cylinder, and is pivotally connected at 19 to the adjacent brake shoe. A spring 20 connected to the two brake shoes yieldingly urges said shoes toward retracted positions away from contact with the brake drum.

The end walls 18 of the brake cylinder consist of rubber caps which embrace the outer ends of the cylinder 15 and engage in external grooves formed in the outer surface of the cylinder wall.

Engaging the inner surface of each of the brake pistons 16 is a packing cup 21 of leather or other suitable yielding material and within each packing cup 21 there is a reinforcing cup member 22, preferably formed of relatively thin metal. In the central portion of the cylinder between the two pistons is a coil spring 23 engaging the reinforcing member 22 of both pistons and having sufficient tension to hold the packing cups 21 in contact with the respective pistons at all times, the tension of the spring 23 being relatively light as compared with the tension of the spring 20 so that the spring 23 has no appreciable retarding effect upon the release of the brake shoes. With this arrangement no nuts or other fastening means are required within the brake cylinder and the pistons, as well as the cup packings and their reinforcing members, may be entirely devoid of openings, particularly these parts do not require axial bores for reception of a piston rod (as is usual in other piston assemblies), which necessitate fluid-tight joints with the piston rods. A fluid port 24 leads into the brake cylinder 15 between the two pistons and communicates by means of a suitable conduit 25 with a suitable source of fluid under pressure, such as a master brake cylinder.

Each piston 16 has a socket 26 into which the inner rounded end of the companion piston rod 17 engages and each piston rod 17 is provided with a stop abutment which in the present embodiment is an annular shoulder 27 located upon that portion of said rod which is within the brake cylinder and spaced axially from the transverse plane of the outer edge 16a of the associated piston 16. By reason of the pivotal connection afforded by the socket 26 and the rounded end of the piston rod, and the fact that the end wall 18 is formed of rubber, there is provided sufficient flexibility of the piston rod to compensate for the slight deviation of the outer end of the piston rod from the axial center of the brake cylinder which is due to the arcuate movement of the free end of the associated pivoted brake shoe.

The means for compensating for wear of the braking surfaces includes an automatic take-up disc 28 associated with each piston rod 17. As shown in Fig. 4, each of these discs 28 has a central bore 28a defining an inner marginal portion 28c and is slit radially at circularly spaced intervals as indicated at 28e, said slits preferably extending inwardly to said inner marginal portion 28c and defining a plurality of radially disposed segmental members 28s.

The discs 28 are made of relatively thin spring metal and in initial condition they are substantially flat and of slightly larger external diameter than the diameter of the bore of the brake cylinder 15. When the discs 28 are initially inserted into the cylinder bore, in front of the respective pistons, the several segmental members 28s thereof are bowed slightly inwardly, as shown in Fig. 3, so that their inherent spring tension tends to force the peripheral edges of said segments into forceful contact with the cylinder wall. In such position of the discs 28 the inner marginal portions 28a thereof will be behind the stop shoulder 27 of the associated piston rod, and when the mechanism is in the normal position shown in Fig. 3, the normalizing spring 20 will urge the two brake members or shoes 14 and their associated piston rods 17 toward each other until the stop shoulders 27 engage the inner marginal portions 28c of the respective take-up discs 28. This inward pressure of the shoulder 27 against the inner marginal portion 28c of the disc 28 will tend to urge the disc inwardly but, due to the bowed curvature of the several segments 28s and the resulting angle of contact of their peripheral edges with the wall of the cylinder 15 these segments assume the function of compression struts having a one-way gripping or biting action against the cylinder wall, which gripping or biting action will effectively prevent inward movement of the disc 28 and of the piston rod 17 and its connected parts. The discs thus constitute an adjustable stop means for limiting the retractive movements of the brake actuating piston rods and the associated brake shoes.

In a brake applying operation, fluid under pressure is forced into the central portion of the brake cylinder 15, between the opposed portions 16, by way of the conduit 25 and the inlet port 24. The pressure exerted by the pressure generating means will cause the two brake pistons 16 and their associated piston rods to separate, thus causing the brake shoes 14 to be expanded into braking contact with the brake drum 10. In a normal braking operation of this character the take-up discs 28 remain in the positions shown and the piston rods 17 freely slide through the bores 28a of the respective discs, the stop shoulders 27 on the rods 17 moving away from the inner marginal portions 28c of said discs and the outer peripheral edges 16a of the pistons moving toward the outer marginal portions of the segments 28s thereof. It will, however, be noted that in the normal condition of the mechanism, the edge 16a of each piston is spaced from the outer marginal portion of the associated take-up disc 28, a distance indicated at $x$ in Fig. 3. This distance $x$ determines the full brake applying movement necessary under normal conditions to secure a maximum braking effect and may aptly be termed the zone of normal maximum brake movement.

Upon wear of the braking surfaces a greater expansion of the brake shoes 14 will be required in order to properly contact with the brake drum 10 and consequently the brake operating piston rods 17 and pistons 16 must be further forced outwardly. When this condition exists the first subsequent braking operations will first cause the brake pistons 16 to travel outwardly the distance $x$ to bring the outer edges 16a of said pistons into contact with the outer margined portions of the several segments 28s of the take-up or stop discs 28, and, during a further outward travel of said pistons 16 to take-up or compensate for the wear of the braking surfaces, each piston will bodily translate or slide its associated take-up disc 28 outwardly along the wall of the cylinder bore, a distance equal to the amount of wear to be compensated for, thus advancing said disc 28 and advancing the zone of normal maximum brake movement $x$.

The zones of movement are thus advanced by reason of the fact that no retrograde movements of the take-up or compensating stop discs 28 are possible since they always remain at their furthest outward points of advance, to which they are moved during the first subsequent braking operation after the wear occurs. Thus said discs 28, in their new positions, arrest the next return movements of the piston rods 17, after which the maximum zones of movement of the brake shoes and their operating pistons and piston rods again become equal to $x$, with said zones in relatively new positions advanced in proportion to the amount of wear compensated for.

In the foregoing description the term "brake shoe" is intended to include other commonly known devices for the application of brake pressure, such as flexible brake bands and discs, and while the operating mechanism is illustrated and described as applied to an internal type of brake, it should be understood that the principle upon which the present invention is based may with equal facility be applied to various types of brakes, including those of the external shoe or brake band type. It will also be obvious that the invention may be utilized in combination with those types of brake mechanisms requiring only one piston and piston rod in the brake cylinder.

While in the preferred arrangement above described each take-up disc 28 is bodily translated by the engagement of the outer edge 16a of the associated piston with the outer marginal portion of said disc, it will be appreciated that approximately the same effect can be had by engaging an inner portion of the piston against the inner portion of the disc, as illustrated in Fig. 5, wherein the hub portion of the piston has been lengthened and the skirt portion thereof has been somewhat shortened. In this arrangement the outer end 16c of the piston hub constitutes the translating abutment which engages the inner portion of the disc 28 and translates said disc in a wear compensating operation.

Another quite similar arrangement is illustrated in Fig. 6 wherein the translating abutment 16e is directly upon the rod, in which case the piston itself at no time directly engages the take-up disc 28. In this arrangement the rounded end portion of the rod, including the translating abutment, is made in the form of a separable part so that the disc may be assembled upon the rod between the two abutments.

From the above it will be evident that the mechanism herein illustrated and described is fully capable of fulfilling the objects primarily stated. However, it is to be understood that I do not wish to limit the invention to the specific form of embodiment disclosed, for it is susceptible of embodiment in various other forms such as will come within the broad scope of the following claims.

I claim as my invention:

1. In a brake mechanism, the combination of: a pair of opposed relatively movable brake members; a cylinder; an operating means including a piston within said cylinder and an associated rod for forcing one of said brake members into braking contact with the other, there being a stop abutment on said rod and an opposed translating abutment relatively spaced from said stop abutment a distance equal to the normal maximum stroke of said operating means; and an automatic take-up device between said abutments and having a one-way gripping engagement with the cylinder wall, said device being positioned so as to be engaged by said stop abutment during a brake release stroke of the operating means, to limit the separation of the brake members, and so as to be engaged and bodily translated by said translating abutment when the normal maximum brake applying stroke of said operating means is exceeded by reason of wear of the brake members, to compensate for such wear.

2. In a brake mechanism, the combination of: a pair of opposed relatively movable brake members; a cylinder; an operating means including a piston within said cylinder and an associated rod for forcing one of said brake members into braking contact with the other, there being a stop abutment on said rod and an opposed translating abutment relatively spaced from said stop abutment a distance equal to the normal maximum stroke of said operating means; and an automatic take-up strut device between said abutments and having a one-way gripping engagement with the cylinder wall, said device being positioned so as to be engaged by said stop abutment during a brake release stroke of the operating means, to serve as a compression strut limiting the separation of the brake members, and so as to be engaged and bodily translated by said translating abutment when the normal maximum brake applying stroke of said operating means is exceeded by reason of wear of the brake members, to compensate for such wear.

3. In a brake mechanism, the combination of: a pair of opposed relatively movable brake members; a cylinder; an operating means including a piston within said cylinder and an associated rod for forcing one of said brake members into braking contact with the other, there being a stop abutment on said rod and an opposed translating abutment relatively spaced from said stop abutment a distance equal to the normal maximum stroke of said operating means; and an automatic take-up device between said abutments and having a one-way gripping engagement with the cylinder wall, said device being positioned so as to be engaged at its inner portion by said stop abutment during a brake release stroke of the operating means, to limit the separation of the brake members, and so as to be engaged at a point adjacent the cylinder wall and bodily translated by said translating abutment when the normal maximum brake applying stroke of said operating means is exceeded by reason of wear of the brake members, to compensate for such wear.

4. In a brake mechanism, the combination of: a pair of opposed relatively movable brake members; a cylinder; an operating means including a piston within said cylinder and an associated rod for forcing one of said brake members into braking contact with the other, there being a stop abutment on said rod and an opposed translating abutment relatively spaced from said stop abutment a distance equal to the normal maximum stroke of said operating means; and an automatic take-up strut device between said abutments and having a one-way gripping engagement with the cylinder wall, said device being positioned so as to be engaged at its inner portion by said stop abutment during a brake release stroke of the operating means, to serve as a compression strut limiting the separation of the brake members, and so as to be engaged at a point adjacent the cylinder wall and bodily translated by said translating abutment when the normal maximum brake applying stroke of said operating means is exceeded by reason of wear of the brake members, to compensate for such wear.

5. In a brake mechanism, the combination of: a pair of opposed relatively movable brake members; a cylinder; an operating means including a piston within said cylinder and an associated rod for forcing one of said brake members into braking contact with the other, there being a stop abutment on said rod and an opposed translating abutment relatively spaced from said stop abutment a distance equal to the normal maximum stroke of said operating means; and an automatic spring-metal take-up element transversely disposed in said cylinder between said abutments and having a cylinder engaging portion flexed longitudinally of the cylinder toward said translating abutment so that the inherent tension of said element is exerted to cause a one-way gripping engagement of said element against the cylinder wall, said element being positioned so as to be engaged at its inner portion by said stop abutment during a brake release stroke of the operating means, to limit the separation of the brake members, and so as to be engaged at a point adjacent the cylinder wall and bodily translated by said translating abutment when the normal maximum brake applying stroke of said operating means is exceeded by reason of wear of the brake members, to compensate for such wear.

6. In a brake mechanism, the combination of: a pair of opposed relatively movable brake members; a cylinder; an operating means including a piston within said cylinder and an associated rod for forcing one of said brake members into braking contact with the other, there being a stop abutment on said rod and an opposed translating abutment relatively spaced from said stop abutment a distance equal to the normal maximum stroke of said operating means; and an automatic spring-metal take-up disc transversely disposed in said cylinder and surrounding said rod between said abutments, said take-up disc having its outer marginal portion radially split at circularly spaced intervals and flexed longitudinally of said cylinder toward said translating abutment so that its inherent tension is exerted to insure a one-way gripping engagement of said disc against the cylinder wall, and said take-up disc being positioned so as to be engaged by said stop abutment during a brake release stroke of the operating means, to limit the separation of the brake members, and so as to be engaged and bodily translated by said translating abutment when the normal maximum brake applying stroke of said operating means is exceeded by reason of wear of the brake members, to compensate for such wear.

7. In a brake mechanism, the combination of: a pair of opposed relatively movable brake members; a cylinder; an operating means including a piston within said cylinder and an associated rod for forcing one of said brake members into braking contact with the other, there being a stop abutment on said rod and an opposed translating abutment relatively spaced from said stop abutment a distance equal to the normal maximum stroke of said operating means; and an automatic spring-metal take-up disc transversely disposed in said cylinder and surrounding said rod between said abutments, said take-up disc having its outer marginal portion radially split at circularly spaced intervals and flexed longitudinally of said cylinder toward said translating abutment so that its inherent tension is exerted to insure a one-way gripping engagement of said disc against the cylinder wall, and said take-up disc being positioned so that its inner marginal portion surrounding said rod will be engaged by said stop abutment during a brake release stroke of the operating means, to cause said disc to function as a compression strut for arresting said brake release stroke, and so that its outer marginal portion adjacent the cylinder wall will be engaged by the translating abutment when the normal maximum brake applying stroke of the operating means is exceeded by reason of wear of the brake members, to thus bodily translate said take-up disc for compensating for such wear.

8. A take-up element for a piston-rod of a brake operating piston and cylinder, said element comprising a normally flat disc of spring metal having a central bore and an outer marginal portion radially split at circularly spaced intervals, said element being larger in diameter than the bore of the cylinder in which it is intended to function, so that it will be necessary to longitudinally flex said outer marginal portion to insert said element into said cylinder, whereby said outer marginal portion will have a one-way gripping engagement with the cylinder wall when said take-up element is in its position of use.

In testimony whereof, I have hereunto set my hand at Los Angeles, California, this 1st day of March, 1929.

ROBERT W. FISHBACK.